United States Patent
Wong et al.

(10) Patent No.: US 11,724,498 B2
(45) Date of Patent: Aug. 15, 2023

(54) LIQUID EJECTION DEVICE AND IMAGE FORMING APPARATUS

(71) Applicant: TOSHIBA TEC KABUSHIKI KAISHA, Tokyo (JP)

(72) Inventors: Meng Fei Wong, Mishima Shizuoka (JP); Ryutaro Kusunoki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/356,432

(22) Filed: Jun. 23, 2021

(65) Prior Publication Data
US 2022/0184948 A1  Jun. 16, 2022

(30) Foreign Application Priority Data
Dec. 11, 2020 (JP) ............................. JP2020-206255

(51) Int. Cl.
*B41J 2/045* (2006.01)
*B41J 2/14* (2006.01)
*B41J 2/175* (2006.01)

(52) U.S. Cl.
CPC ......... *B41J 2/1433* (2013.01); *B41J 2/04573* (2013.01); *B41J 2/175* (2013.01); *B41J 2002/14459* (2013.01)

(58) Field of Classification Search
CPC .................................................. B41J 2/04543
See application file for complete search history.

(56) References Cited

U.S. PATENT DOCUMENTS

| | | | | |
|---|---|---|---|---|
| 2005/0073537 A1* | 4/2005 | Iwao | ................... | B41J 2/04581 347/11 |
| 2016/0279942 A1* | 9/2016 | Kusunoki | ............ | B41J 2/14233 |
| 2017/0144435 A1* | 5/2017 | Kondo | ................ | B41J 2/04581 |
| 2020/0070508 A1 | 3/2020 | Kusunoki et al. | | |

FOREIGN PATENT DOCUMENTS

| | | |
|---|---|---|
| EP | 3643502 A2 | 4/2020 |
| JP | H07-68764 A | 3/1995 |
| JP | 2019-104214 A | 6/2019 |
| JP | 2019-130713 A | 8/2019 |

OTHER PUBLICATIONS

Extended European Search Report dated Jan. 19, 2022 in corresponding European Patent Application No. 21188986.0, 10 pages.

* cited by examiner

*Primary Examiner* — Shelby L Fidler
(74) *Attorney, Agent, or Firm* — Kim & Stewart LLP (57) ABSTRACT

A liquid ejection device includes a liquid supply unit, an array of nozzles arranged in a matrix and through which liquid is ejected, actuators each connected to one of the nozzles, and a circuit configured to output signals to the actuators according to delay times that are predetermined in a matrix corresponding to the matrix of the array. The delay times include (k+l−1) or more different delay times where the matrix thereof has k columns and l rows. The matrix is defined such that a difference of two adjacent delay times in each of column and row directions is an odd multiple of a half cycle of a natural vibration period of the liquid, and between two adjacent columns and rows, two or more different delay time differences exist between each pair of corresponding delay times of the adjacent columns and rows, respectively.

17 Claims, 10 Drawing Sheets

| EXAMPLE 1 | EXAMPLE 2 |
|---|---|
|  |  |
| EXAMPLE 3 | EXAMPLE 4 |
|  |  |

FIG. 12

COMPARATIVE EXAMPLE 1

(I-3) ROW     I ROW

| k COLUMN | 2 | 3 | 0 | 5 |
|---|---|---|---|---|
|  | 1 | 6 | 3 | 4 |
| Q | 0 | 5 | 2 | 3 |
| (k-3) COLUMN | 3 | 4 | 1 | 6 |

$\Delta T_i = [3110113011303110...]^T$
$\Delta T_j = [1551333351153333...]^T$

COMPARATIVE EXAMPLE 2

(I-3) ROW     I ROW

| k COLUMN | 1 | 4 | 5 | 6 |
|---|---|---|---|---|
|  | 0 | 3 | 4 | 5 |
| Q | 3 | 6 | 1 | 2 |
| (k-3) COLUMN | 2 | 5 | 0 | 1 |

$\Delta T_i = [1310131013101310...]^T$
$\Delta T_j = [3333551111111155...]^T$

FIG. 13

COMPARATIVE EXAMPLE 1

COMPARATIVE EXAMPLE 2

FIG. 14

| k COLUMN | l ROW | NUMBER OF MINIMUM DELAY TIME TYPES |
|---|---|---|
| 2 | 2 | 3 |
| 2 | 4 | 5 |
| 4 | 2 | 5 |
| 4 | 4 | 7 |
| 8 | 2 | 9 |
| 8 | 4 | 11 |

FIG. 15

EXAMPLE 5

|  | (I-1) ROW | I ROW |
|---|---|---|
| k COLUMN | 1 | 0 |
| (k-1) COLUMN | 0 | 3 |

Q

EXAMPLE 6

|  | (I-3) ROW |  |  | I ROW |
|---|---|---|---|---|
| k COLUMN | 6 | 3 | 4 | 3 |
| (k-1) COLUMN | 1 | 0 | 1 | 6 |

Q

EXAMPLE 7

|  | (I-1) ROW | I ROW |
|---|---|---|
| k COLUMN | 1 | 4 |
|  | 0 | 1 |
|  | 3 | 6 |
| (k-3) COLUMN | 4 | 3 |

Q

EXAMPLE 8

|  | (I-1) ROW | I ROW |
|---|---|---|
| k COLUMN | 5 | 8 |
|  | 4 | 3 |
|  | 9 | 0 |
|  | 6 | 1 |
|  | 5 | 6 |
|  | 0 | 9 |
|  | 3 | 10 |
| (k-7) COLUMN | 4 | 5 |

Q

EXAMPLE 9

|  | (I-3) ROW |  |  | I ROW |
|---|---|---|---|---|
| k COLUMN | 7 | 2 | 5 | 10 |
|  | 4 | 1 | 0 | 7 |
|  | 9 | 6 | 3 | 8 |
|  | 8 | 9 | 4 | 3 |
|  | 5 | 10 | 9 | 6 |
|  | 0 | 5 | 6 | 5 |
|  | 1 | 2 | 5 | 10 |
| (k-7) COLUMN | 4 | 1 | 0 | 7 |

Q

LIQUID EJECTION DEVICE AND IMAGE FORMING APPARATUS

CROSS-REFERENCE TO RELATED APPLICATION

This application is based upon and claims the benefit of priority from Japanese Patent Application No. 2020-206255, filed Dec. 11, 2020, the entire contents of which are incorporated herein by reference.

FIELD

Embodiments described herein relate generally to a liquid ejection device and an image forming apparatus.

BACKGROUND

A liquid ejection device that supplies a predetermined amount of liquid to a predetermined position is known. Such a liquid ejection device can be installed in, for example, an inkjet printer, a 3D printer, a liquid dispensing device, or the like. The inkjet printer ejects ink droplets from an inkjet head to form an image on the surface of a recording medium. The 3D printer ejects droplets of a modeling material from a modeling material ejection head and the droplets are cured to form a three-dimensional modeled object. The liquid dispensing device ejects droplets of a sample solution or the like and supplies a predetermined amount of liquid to containers or the like.

In a liquid ejection device equipped with a plurality of nozzles that are driven by actuators to eject liquid, crosstalk may happen in which the ejection speed and the ejection amount change unintentionally due to the influence of the vibration(s) generated when the surrounding nozzles eject the liquid. In order to prevent crosstalk, an approach being studied is to shift the drive timing of the nozzles in different columns or rows.

Specifically, a drive signal can be supplied to adjacent nozzle actuators or the like with a delay time difference. For example, the nozzles adjacent to each other in a column direction that are to be driven in the same drive cycle can have a delay time difference of an odd multiple of a half cycle of a natural vibration of the liquid being ejected from the nozzles. Similarly, a drive signal can be supplied to an actuator with a delay time difference of an odd multiple of the half cycle for the nozzles adjacent to each other in a row direction during the same drive cycle.

However, even if crosstalk can be prevented in this manner, when nozzles having the same difference in the row-to-row delay time or difference in the column-to-column delay time are arranged continuously in the row direction or column direction, a periodic printing unevenness may still occur and the printing quality may deteriorate.

DETAILED DESCRIPTION

Embodiments provide a liquid ejection device and an image forming apparatus capable of preventing the occurrence of periodic printing unevenness.

In general, according to one embodiment, a liquid ejection device includes a liquid supply unit from which liquid is supplied, a nozzle unit including an array of nozzles arranged in a matrix and through which the liquid is ejected, a plurality of actuators each connected to a corresponding one of the nozzles, and an actuator drive circuit configured to output drive signals to the actuators according to delay times that are predetermined in a matrix corresponding to the matrix of the array. The delay times include (k+l−1) or more different delay times where the matrix thereof has k columns and l rows. The matrix of the delay times is predetermined such that a difference of two delay times that are adjacent in each of column and row directions is an odd multiple of a half cycle of a natural vibration period of the liquid in the nozzle unit, and between two adjacent columns and rows, two or more different delay time differences exist between each pair of corresponding delay times of the adjacent columns and rows, respectively.

Hereinafter, a liquid ejection device and an image forming apparatus according to one or more embodiments will be described with reference to the accompanying drawings. In each drawing, the same configurations are designated by the same reference numerals.

An inkjet printer 10 that prints an image on a recording medium will be described as one example of an image forming apparatus equipped with a liquid ejection device 1 in an embodiment.

Figure 1:
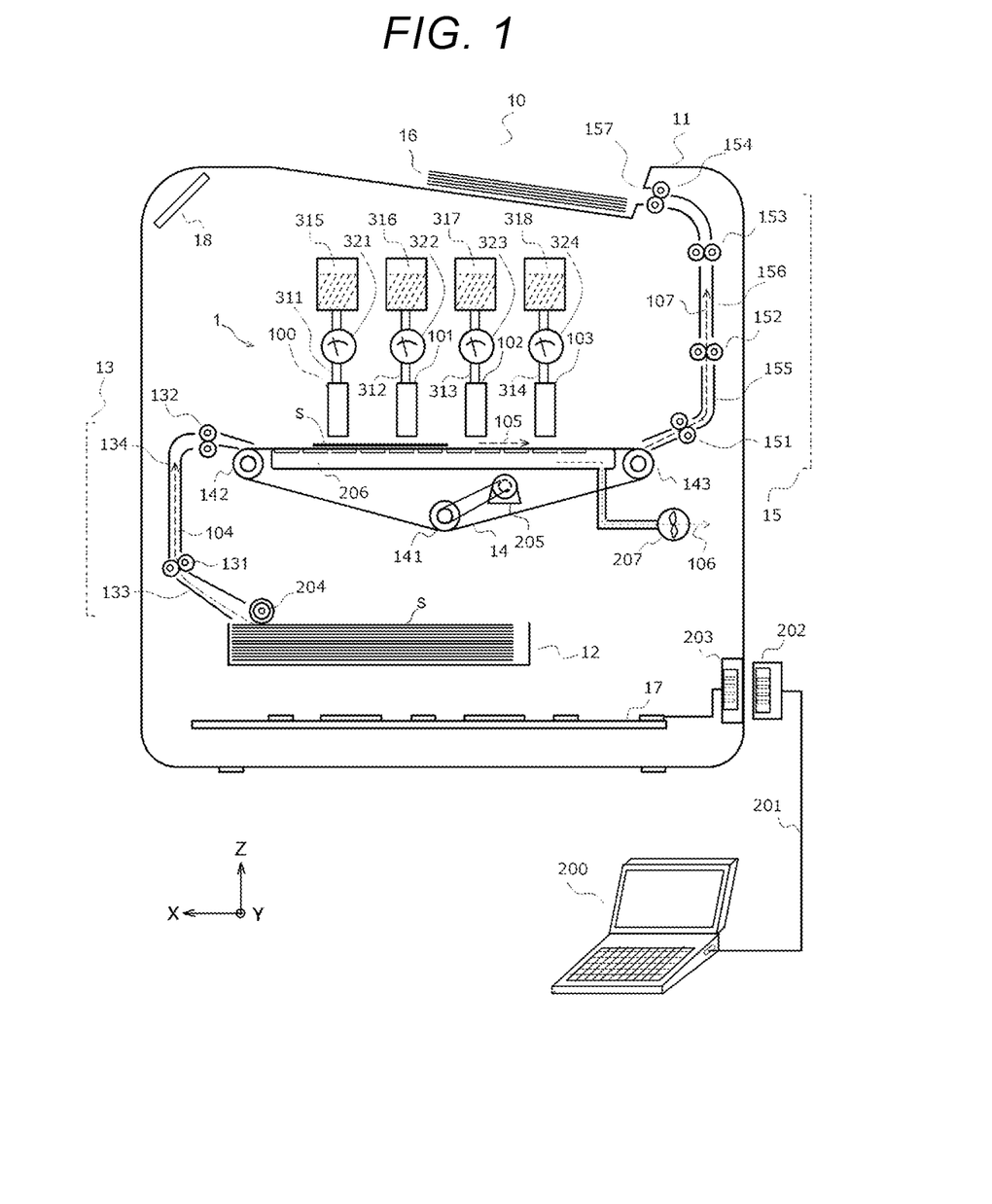
FIG. 1 is an overall configuration diagram of an inkjet printer according to an embodiment.

FIG. 1 illustrates a schematic configuration of an inkjet printer 10. Inside a housing 11 of the inkjet printer 10, a cassette 12 for storing a sheet S, which is an example of a recording medium, an upstream conveyance path 13 for the sheet S, a conveyance belt 14 that conveys the sheet S, a plurality of inkjet heads 100 to 103 that eject ink droplets toward the sheet S on the conveyance belt 14, a downstream conveyance path 15 for the sheet S, a discharge tray 16, and a control substrate 17 are disposed. An operation unit 18, which is a user interface, is disposed on the upper side of the housing 11.

The image data to be printed on the sheet S is generated by, for example, a computer 200 which is an externally connected device. The image data generated by the computer 200 is sent to the inkjet printer 10 through a cable 201 and connectors 202 and 203.

A pickup roller 204 supplies the sheets S one by one from the cassette 12 to the upstream conveyance path 13. The upstream conveyance path 13 includes feed roller pairs 131 and 132 and sheet guide plates 133 and 134. The sheet S is fed to the upper surface of the conveyance belt 14 via the upstream conveyance path 13. In the drawing, an arrow 104 indicates the conveyance path of the sheet S from the cassette 12 to the conveyance belt 14.

The conveyance belt 14 is a net-like endless belt having a large number of through holes formed therein. The three rollers, that is, a drive roller 141 and driven rollers 142 and 143, rotatably support the conveyance belt 14. A motor 205 rotates the conveyance belt 14 by rotating the drive roller 141. In the drawing, the arrow 105 indicates the rotation direction of the conveyance belt 14. A negative pressure container 206 is disposed on the back surface side of the conveyance belt 14. The negative pressure container 206 is connected to a depressurizing fan 207. The fan 207 creates a negative pressure inside the negative pressure container 206 by the air flow and attracts and holds the sheet S to the upper surface of the conveyance belt 14. In the drawing, the arrow 106 indicates the direction of the air flow.

The inkjet heads 100 to 103 are disposed to face the sheet S on the conveyance belt 14 with a slight gap of, for example, 1 mm therebetween. Each of the inkjet heads 100 to 103 ejects ink droplets toward the sheet S. The inkjet heads 100 to 103 operate to print an image when the sheet S passes below. Each of the inkjet heads 100 to 103 has the same structure except that the colors of the ejected inks are different. The ink colors are, for example, cyan, magenta, yellow, and black.

The inkjet heads 100 to 103 are connected to ink tanks 315 to 318 and ink supply pressure adjusting devices 321 to 324, respectively, via ink flow paths 311 to 314. The ink tanks 315 to 318 are disposed above the inkjet heads 100 to 103. In order to prevent ink from leaking from the nozzles 24 (see FIG. 2) of the inkjet heads 100 to 103 during standby (non-printing times), each of the ink supply pressure adjusting devices 321 to 324 adjusts the pressure inside the inkjet heads 100 to 103 to a be negative pressure with respect to the atmospheric pressure, for example, −1.2 kPa.

At the time of image formation, the inks in the ink tanks 315 to 318 are supplied to the inkjet heads 100 to 103 by the ink supply pressure adjusting devices 321 to 324.

After forming an image, the sheet S is conveyed by the conveyance belt 14 to the downstream conveyance path 15. Along the downstream conveyance path 15, feed roller pairs 151, 152, 153, and 154, and sheet guide plates 155 and 156 are arranged. The sheet S is discharged from a discharge port 157 to the discharge tray 16 via the downstream conveyance path 15. In the drawing, the arrow 107 indicates the conveyance path of the sheet S.

The configurations of the inkjet heads 100 to 103 will be described. The inkjet head 100 will be described below with reference to FIGS. 2 to 5, but the inkjet heads 101 to 103 also have the same structure as the inkjet head 100.

Figure 2:
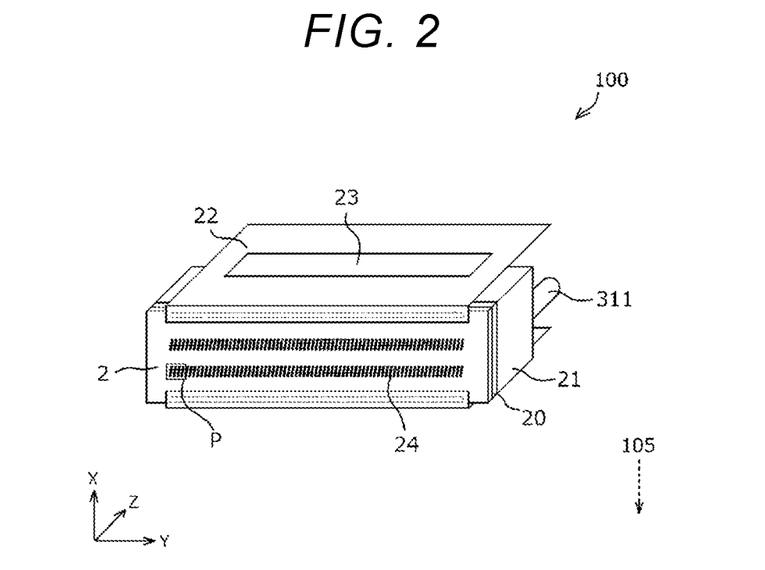
FIG. 2 is a perspective view of an inkjet head of an inkjet printer.

FIG. 2 is an external perspective view of the inkjet head 100. The inkjet head 100 includes a nozzle plate 2, a substrate 20, an ink supply unit 21, a flexible substrate 22, and a drive circuit 23. A plurality of nozzles 24 for ejecting ink are formed on the nozzle plate 2. The ink ejected from each nozzle 24 is supplied from the ink supply unit 21. The ink flow path 311 from the ink supply pressure adjusting device 321 described above is connected to the upper side of the ink supply unit 21 (+Z side in FIG. 2). The arrow 105 indicates the rotation direction (that is, the printing direction) for the conveyance belt 14 that conveys the sheet S (see FIG. 1).

Figure 3:
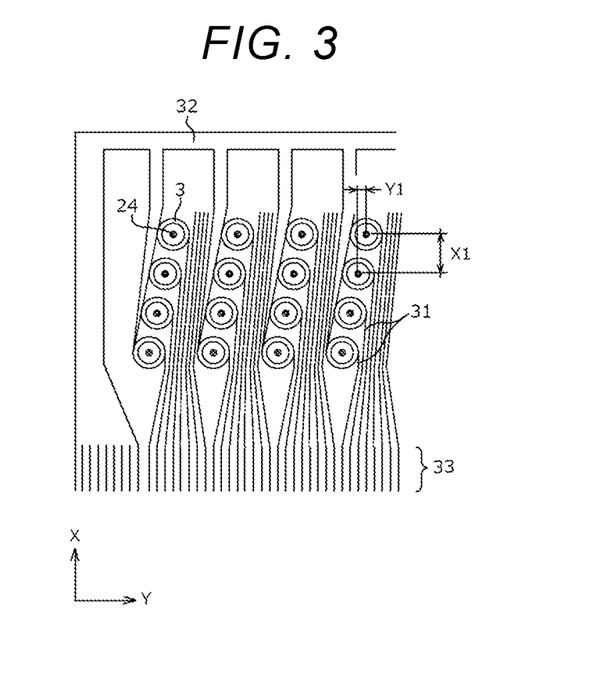
FIG. 3 is a partially enlarged plan view of a nozzle plate of an inkjet head.

FIG. 3 is an enlarged plan view of the portion P surrounded by a line in FIG. 2. The nozzles 24 are two-dimensionally arranged in a row direction, which corresponds generally to the X-axis direction, and a column direction, which corresponds to the Y-axis direction. However, the nozzles 24 along a row are offset from one another in the Y-axis direction so that each row extends diagonally (angled with respect to the X-axis) so that the nozzles 24 in the same row do not overlap with one another in the X-axis direction.

The nozzles 24 are disposed at intervals of a distance X1 in the X-axis direction and a distance Y1 in the Y-axis direction. As an example, the distance X1 is 338 μm, and the distance Y1 is 84.5 μm. The distance Y1 can be set so that the recording density is 300 DPI (dots per inch) in the Y-axis direction. The distance X1 is set based on the relationship between the rotation speed of the conveyance belt 14 and the time required for the ink to land so that printing can also be performed at 300 DPI in the X-axis direction as well.

In FIG. 2, a total of 600 nozzles 24 are arranged as two sets of 300 nozzles 24 (each set being 4 columns×75 rows). Within each set, there is an array of 75 groups along the Y-axis direction with four nozzles 24 to a group. The four nozzles 24 of each group are spaced from one another in a row generally along the X-direction, but the row forms an angle to the X-axis. However, any number of nozzles 24 may be used.

An actuator 3 that is a drive source for the operation of ejecting ink is provided for each nozzle 24. A set of one nozzle 24 and one actuator 3 makes up one channel. Each actuator 3 is formed in an annular shape and is disposed so that the nozzle 24 is located at the center thereof.

The size of the actuator 3 is, for example, an inner diameter of 30 μm and an outer diameter of 140 μm. Each actuator 3 is electrically connected to an individual electrode 31. Each actuator 3 is electrically connected to the other three actuators 3 arranged in the X-axis direction via a common electrode 32. The individual electrodes 31 and common electrodes 32 are electrically connected to different mounting pads 33. Each mounting pad 33 is an input port through which a drive voltage waveform is input to each actuator 3. In FIG. 3, for convenience of explanation, the actuator 3, the individual electrode 31, and the common electrode 32 are illustrated by solid lines, but in actuality are generally provided inside the nozzle plate 2 (see the vertical cross-sectional view of FIG. 4). However, the position of the actuator 3 is not limited to being inside of the nozzle plate 5.

The mounting pads 33 are electrically connected to the wiring patterns formed on the flexible substrate 22 via, for example, an anisotropic conductive film (ACF). A wiring pattern on the flexible substrate 22 is electrically connected to the drive circuit 23. The drive circuit 23 is, for example, an integrated circuit (IC). The drive circuit 23 selects the channels for ejecting ink according to the image data to be printed and outputs a drive signal to the actuator 3 of a selected channel.

Figure 4:
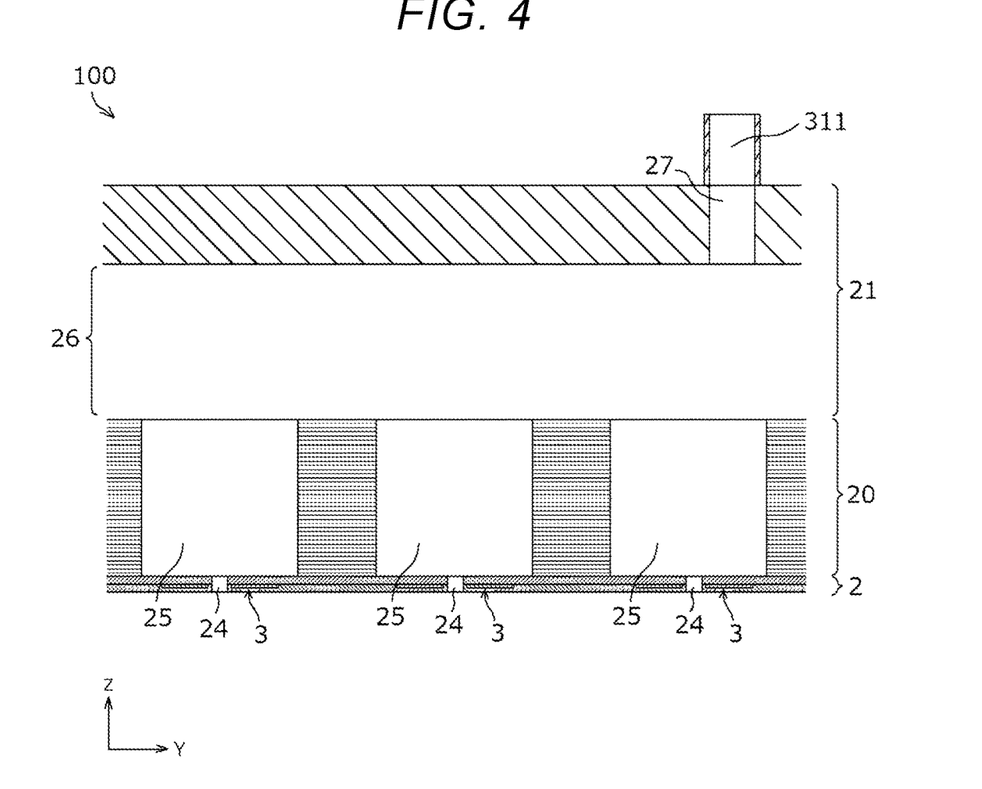
FIG. 4 is a vertical cross-sectional view of an inkjet head.

FIG. 4 is a vertical cross-sectional view of the inkjet head 100. As illustrated in FIG. 4, the nozzle 24 penetrates the nozzle plate 2 in a Z-axis direction. The diameter of the nozzle 24 is, for example, 20 μm.

Inside the substrate 20, an ink pressure chamber 25 communicating with the corresponding nozzle 24 is provided. The ink pressure chamber 25 is, for example, a cylindrical space with an open upper portion. The upper portion of each ink pressure chamber 25 is open and communicates with a common ink chamber 26. The ink flow path 311 communicates with the common ink chamber 26 via an ink supply port 27. The ink pressure chamber 25 and the common ink chamber 26 are filled with ink. The common ink chamber 26 may be formed in a flow path for circulating ink, for example. The ink pressure chamber 25 is, for example, a cylindrical hole formed in the substrate 20 of a single crystal silicon wafer having a thickness of 400 μm and having a diameter of 200 μm. The ink supply unit 21 is made of, for example, alumina ($Al_2O_3$) and has a space corresponding to the common ink chamber 26.

Figure 5:
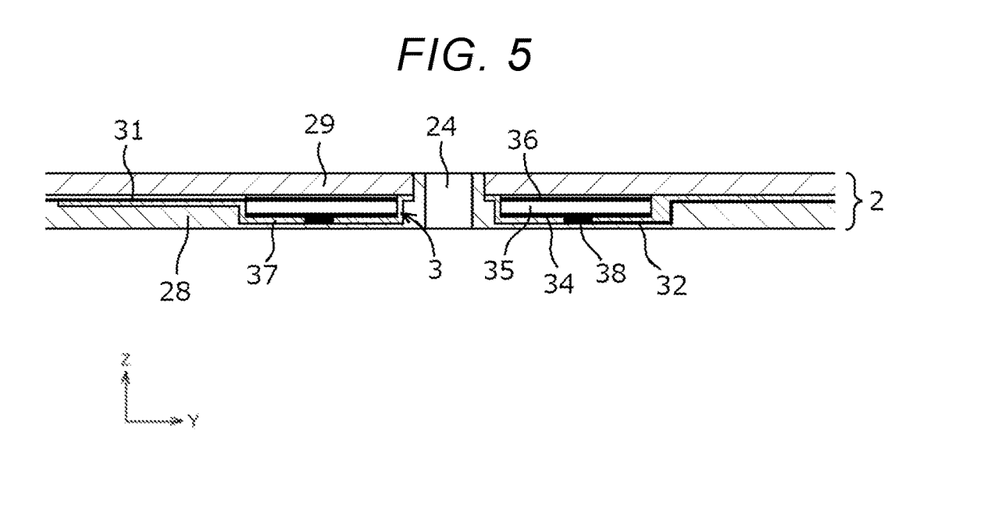
FIG. 5 is a vertical cross-sectional view of a nozzle plate of an inkjet head.

FIG. 5 is a partially enlarged view of the vertical cross section of the nozzle plate 2. The nozzle plate 2 includes a protective layer 28, the actuator 3, and a diaphragm 29 that are in this order from the bottom surface side. The actuator 3 includes an upper electrode 34, a thin plate-shaped piezoelectric body 35, and a lower electrode 36 that are stacked in this order. The lower electrode 36 is electrically connected to the individual electrode 31, and the upper electrode 34 is electrically connected to the common electrode 32. An insulating layer 37 is interposed between the protective layer 28 and the diaphragm 29 to prevent a short circuit between the individual electrode 31 and the common electrode 32. The insulating layer 37 is formed of, for example, a silicon dioxide film ($SiO_2$) having a thickness of 0.5 μm. The upper electrode 34 and the common electrode 32 are electrically connected by a contact hole 38 formed in the insulating layer 37. The piezoelectric body 35 is made of, for example, lead zirconate titanate (PZT) having a thickness of 5 μm or less. The lower electrode 36 and the upper electrode 34 are made of platinum having a thickness of, for example, 0.1 μm. The individual electrode 31 and the common electrode 32 are made of, for example, 0.3 μm thick gold (Au).

The diaphragm 29 is made of an insulating inorganic material. The insulating inorganic material is, for example, silicon dioxide ($SiO_2$). The thickness of the diaphragm 29 is, for example, 2 to 10 μm, preferably 4 to 6 μm. As will be described in detail later, the diaphragm 29 and the protective layer 28 are curved inward as the piezoelectric body 35 to which a voltage is applied is deformed in a $d_{31}$ mode. Then, when the application of a voltage to the piezoelectric body 35 is stopped, the original state is restored. Due to such reversible deformation, the volume of the ink pressure chamber 25 expands and contracts. When the volume of the ink pressure chamber 25 is changed, the ink pressure in the ink pressure chamber 25 changes. Ink is ejected from the nozzle 24 by utilizing the expansion and contraction of the volume of the ink pressure chamber 25 and the change in the ink pressure. That is, the nozzle 24, the actuator 3, and the ink pressure chamber 25 form a liquid ejection portion of the inkjet head 100.

The protective layer 28 is made of, for example, a polyimide having a thickness of 4 μm. The protective layer 28 covers one surface of the nozzle plate 2 facing the sheet S on the bottom surface side, and further covers the inner peripheral surface of the holes of the nozzle 24.

Figure 6:
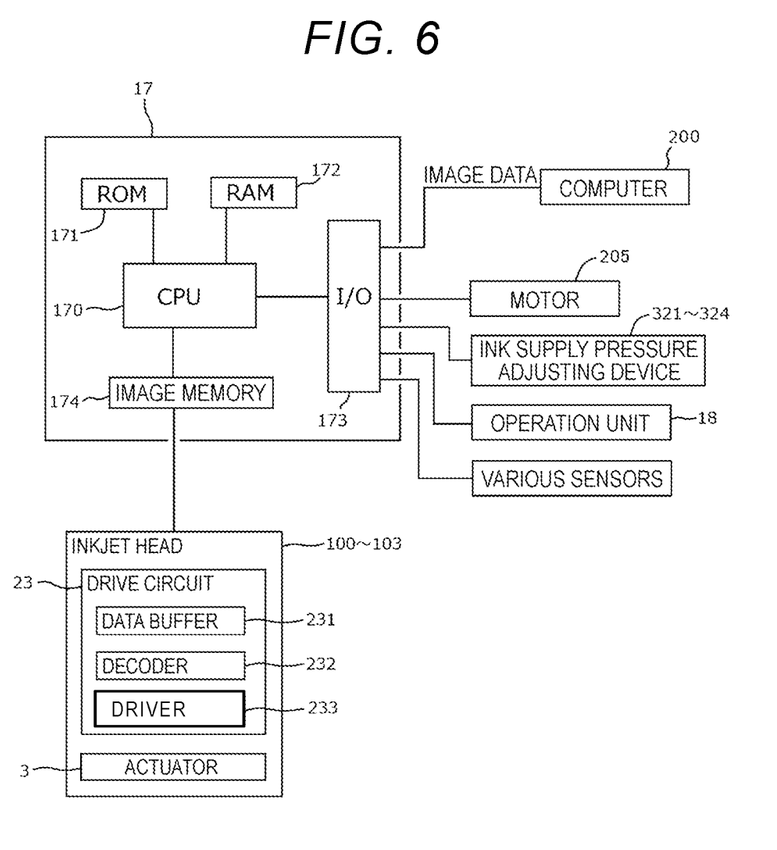
FIG. 6 is a block diagram of a control system of an inkjet printer.

FIG. 6 is a block diagram of the control system of the inkjet printer 10. On the control substrate 17, a CPU (central processing unit) 170, a ROM (read only memory) 171, a RAM (random access memory) 172, an I/O port 173, and an image memory 174 are disposed. The CPU 170 controls the motor 205, the ink supply pressure adjusting devices 321 to 324, the operation unit 18, and various sensors through the I/O port 173. The image data is received from the computer 200 through the I/O port 173 and stored in the image memory 174. The CPU 170 causes the image data stored in the image memory 174 to be transferred to the drive circuits 23 of the inkjet heads 100 to 103 in the drawing order, respectively.

The drive circuit 23 includes a data buffer 231, a decoder 232, and a driver 233. The data buffer 231 stores image data in chronological order for each actuator 3. The decoder 232 controls the driver 233 for each actuator 3 based on the image data stored in the data buffer 231. The driver 233 outputs a drive signal for operating each actuator 3 based on the control of the decoder 232. The drive signal is a voltage applied to the actuator 3 according to the drive waveform. That is, the drive circuit has a function of generating and outputting a drive waveform to the corresponding actuator 3.

Figure 7:
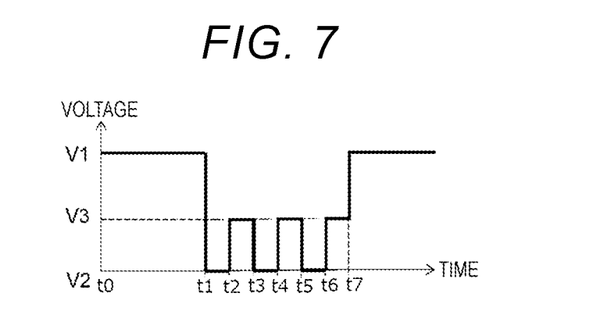
FIG. 7 is a drive waveform for driving an actuator of an inkjet head.

Subsequently, with reference to FIGS. 7 and 8A to 8E, the drive waveform of the drive signal that is output to the actuator 3 and the operation of ejecting ink from the nozzle 24 will be described. FIG. 7 illustrates a multi-drop drive waveform in which ink droplets are dropped three times in one drive cycle with a triple pulse as an example of the drive waveform. The drive waveform in FIG. 7 is referred to as a pulling drive waveform. However, the drive waveform is not limited to the triple pulse. For example, the drive waveform may be a single pulse or a double pulse. The method is not limited to pulling and may be pushing or pushing-and-pulling.

The drive circuit 23 applies a voltage V1 to the actuator 3 as a bias voltage from time t0 to time t1. That is, the voltage V1 is applied to the lower electrode 36 of the actuator 3 through the individual electrodes 31. The common electrode 32 connected to the upper electrode 34 of the actuator 3 is set to 0 V. Then, after a voltage V2 (=0 V) is applied from time t1 to time t2 when the ink ejection operation is started, a voltage V3 is applied from time t2 to time t3 to eject a first ink droplet. After the voltage V2 (=0 V) is applied from time t3 to time t4, the voltage V3 is applied from time t4 to time t5 to eject a second ink droplet. After the voltage V2 (=0 V) is applied from time t5 to time t6, the voltage V3 is applied from time t6 to time t7 to eject a third ink droplet. If droplets are ejected at high speed in quick succession, the droplets will appear to land on the sheet S as a single droplet. At time t7 after the end of ejecting, the voltage V1 is applied as a bias voltage to attenuate the residual vibration in the ink pressure chamber 25. During a series of operations, the voltage of the common electrode 32 is maintained at 0 V.

As shown in FIG. 7, the voltage V3 is smaller than the voltage V1. The voltage V3 is determined based on, for example, the attenuation rate of the pressure vibration of the ink in the ink pressure chamber 41. The time periods from time t1 to time t2, the time from time t2 to time t3, the time from time t3 to time t4, the time from time t4 to time t5, the time from time t5 to time t6, the time from time t6 to time t7 are set to a half cycle of the natural vibration cycle λ, which is determined by the characteristics of the ink and the internal structure of the head, respectively. The half period of the natural vibration period λ is also called an acoustic length (AL).

A natural vibration period λ can be measured by detecting a change in the impedance of the actuator 3 when the ink fills the ink pressure chamber 25. For impedance detection, for example, an impedance analyzer is used. As another method for measuring the natural vibration period λ, an electric signal such as a step waveform may be input from the drive circuit 23 to the actuator 3, and the vibration of the actuator 3 may be measured with a laser Doppler vibrometer. In some instances, the vibration of the actuator 3 may be obtained by calculation based on a computer simulation.

Figure 8A:
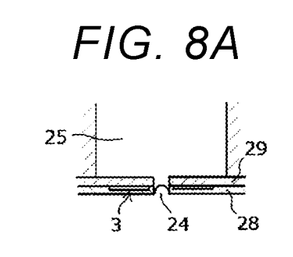
FIG. 8A to FIG. 8E are diagrams each illustrating an ink ejection operation by an actuator.
Figure 8B:
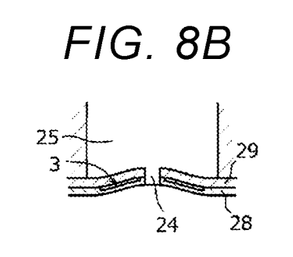

FIGS. 8A to 8E schematically illustrate the ink ejection operation when the actuator 3 is driven by the drive waveform of FIG. 7. From time t0 to time t1, the actuator 3 is in a standby state. When the voltage V1 is applied as the bias voltage in the standby state, an electric field is generated in the thickness direction of the piezoelectric body 35, and the piezoelectric body 35 is deformed in the $d_{31}$ mode as illustrated in FIG. 8B. Specifically, the annular piezoelectric body 35 extends in the thickness direction and contracts in the radial direction. Bending stress is generated in the diaphragm 29 due to the deformation of the piezoelectric body 35, and the actuator 3 bends inward. That is, the actuator 3 is deformed to form a depression centered on the nozzle 24, and the volume of the ink pressure chamber 25 contracts.

Figure 8C:
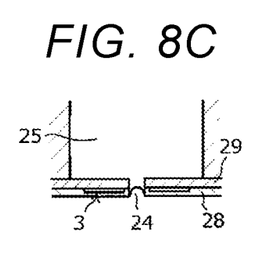

When a voltage V2 (=0 V) as an expansion pulse is applied at time t1, the actuator 3 returns to the state before deformation as schematically illustrated in FIG. 8C. Here, in the ink pressure chamber 25, the internal ink pressure decreases as the volume returns to the original state, but the ink pressure increases as the ink is supplied from the common ink chamber 25. Thereafter, at time t2, the ink supply to the ink pressure chamber 25 is stopped, and the increase in ink pressure is also stopped. This state is referred to as a pulling state.

Figure 8D:
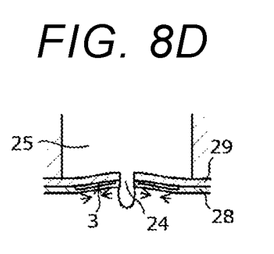
Figure 8E:
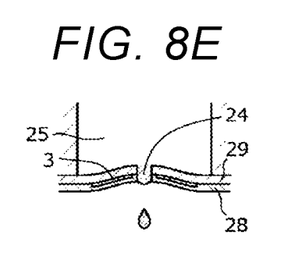

When the voltage V3 as a contraction pulse is applied at time t2, the piezoelectric body 35 of the actuator 3 is deformed again and the volume of the ink pressure chamber 25 contracts. As described above, the ink pressure in the ink pressure chamber 25 is increasing, and by further contracting the volume of the ink pressure chamber 25 to increase the ink pressure, ink is extruded from the nozzle 24 as schematically illustrated in FIG. 8D. The application of the voltage V3 continues until time t3, and the ink is ejected from the nozzle 24 as schematically illustrated in FIG. 8E. That is, the first ink droplet is ejected.

When the voltage V2 (=0 V) is applied from time t3 to time t4 and then the voltage V3 is applied from time t4 to time t5, the second ink droplet is ejected by the same operation and action (FIGS. 8B to 8E). When the voltage V2 (=0 V) is applied from time t5 to time t6 and then the voltage V3 is applied from time t6 to time t7, the third ink droplet is ejected by the same operation and action (FIGS. 8B to 8E).

When the third ink droplet is ejected, the voltage V1 as a cancel pulse is applied at time t7. That is, when the ink is ejected, the ink pressure in the ink pressure chamber 25 decreases, and the vibration of the ink remains in the ink pressure chamber 25. Therefore, the voltage V1 is applied as a cancel pulse to contract the volume of the ink pressure chamber 25 to attenuate the residual vibration.

When the actuator 3 is driven to eject ink from the nozzle 24, vibration is generated and propagates to the ink pressure chamber 25 of another nozzle 24 disposed around the actuator 3. Therefore, if ink is ejected from another nozzle 24 disposed in the surroundings while the vibration remains, crosstalk may occur due to interference. The generated vibration cycle is the natural vibration cycle $\lambda$, which is determined by the characteristics of the ink and the internal structure of the head. No matter which of the nozzles 24 disposed in the row direction and the column direction ejects ink, vibration having the natural vibration cycle $\lambda$ is generated.

FIGS. 2 and 3 illustrate an array of nozzles 24 with 4 columns and 75 rows. Here, assuming that the coordinates (i, j) represent any nozzle 24 that is the i-th nozzle 24 in the X-axis direction and the j-th nozzle 24 in the Y-axis direction, a nozzle distribution A can be expressed by the following equation:

$$A = (a_{i,j})_{\substack{1 \leq i \leq 4 \\ 1 \leq j \leq 75}} = \begin{pmatrix} a_{1,1} & a_{1,2} & \ldots & a_{1,75} \\ a_{2,1} & a_{2,2} & \ldots & a_{2,75} \\ a_{3,1} & a_{3,2} & \ldots & a_{3,75} \\ a_{4,1} & a_{4,2} & \ldots & a_{4,75} \end{pmatrix} \quad \text{Equation 1}$$

The array of nozzles 24 is not limited to 4 columns and 75 rows, and the nozzle distribution A can be expressed in the same manner if the array has m columns and n rows (where m and n are integers).

Figure 9:
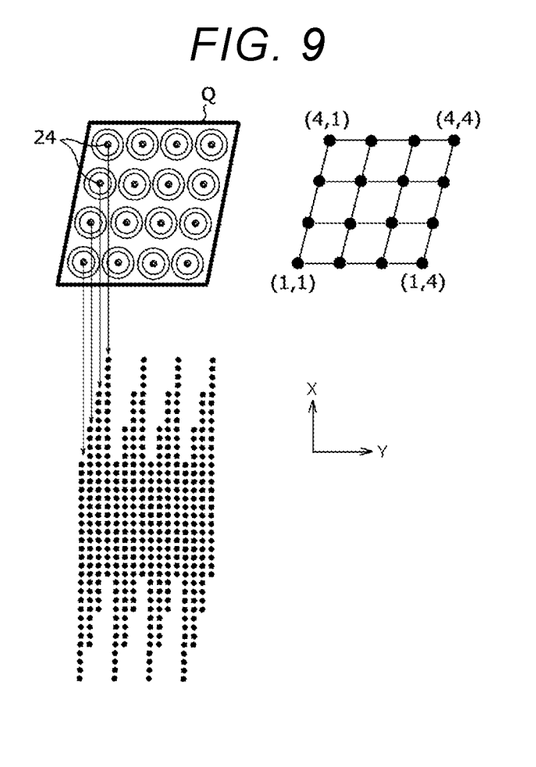
FIG. 9 is a diagram illustrating a print position corresponding to each nozzle of a nozzle plate.

The nozzle 24 corresponding to the print position illustrated in FIG. 9 can be expressed by the following equation as a vec operator of the nozzle distribution A in order from the coordinates (1, 1) set as the lower left corner:

$$\text{vec}(A) = [a_{1,1} a_{2,1} a_{3,1} a_{4,1} a_{1,2} a_{2,2} a_{3,2} a_{4,2} \ldots a_{1,75} a_{2,75} a_{3,75} a_{4,75}]^T \quad \text{Equation 2:}$$

For the nozzles 24 in such an array, the delay time of the drive timing for providing a drive signal to the actuator 3 of a nozzle 24 is set by using a matrix Q with the nozzles 24 in a set of (k columns×l rows (note: lower case L ("l") is being used in this context)). If the number of nozzles 24 disposed in (m columns×n rows) exceeds (k columns×l rows), a delay time can be assigned to all nozzles 24 by repeatedly arranging the matrix Q along the array of nozzles 24 in either one or both of the column and row directions as necessary.

The delay time in the matrix Q of (k columns×l rows) satisfies the following conditions.

First, the delay time in the matrix Q of (k columns×l rows) is set to have a time difference of an odd multiple of the drive timing of the nozzles 24 adjacent to each other in the column direction by half a cycle of the natural vibration cycle $\lambda$ and to have a time difference of an odd multiple of the drive timing of the nozzles 24 adjacent in the row direction by half a cycle of the natural vibration cycle $\lambda$. That is, when the half a cycle of the natural vibration period $\lambda$ is expressed by an acoustic length (AL), the delay time differences of the nozzles 24 adjacent to each other in the column direction and the row direction are all odd multiples of AL (1AL, 3AL, 5AL ... nAL). In this way, by providing a delay time difference of an odd multiple of AL between the drive timings of the nozzles 24 adjacent to each other in the row direction and the column direction, the vibrations can be canceled by the adjacent nozzles 24. That is, crosstalk can be prevented.

Second, at least (k+l−1) types of delay times are assigned in the matrix Q of (k columns×l rows). In this context, no delay (zero delay) is also one of the possible delay times. For example, when setting the delay time in multiples of AL by using a matrix Q of 4 columns×4 rows, for example, 7 types of delay times start from 0AL (i.e., no delay) to 6AL are used.

Third, when the delay time of the i-th nozzle in the X-axis direction and the j-th nozzle in the Y-axis direction is $T_{i,j}$, the delay time should be such that two or more types of delay time differences between rows ($\Delta T_i = |T_{i+1,j} - T_{i,j}|$) are mixed for the nozzles 24 adjacent to each other in the X-axis direction. Similarly, for the nozzles 24 adjacent to each other in the Y-axis direction, two or more types of differences in a row-to-row delay time ($\Delta T_j = |T_{i,j+1} - T_{i,j}|$) are mixed. Since the first and m-th nozzles 24 in the X-axis direction are located at the end of the array (m columns×n rows), any of $T_{1,j}$ and $T_{m,j}$ can be set to zero (Null). Similarly, the first and n-th nozzles 24 in the Y-axis direction are located at the end of the array (m columns×n rows), any of $T_{i,1}$ and $T_{i,n}$ can be set to zero (Null). The reason why at least (k+l−1) types of delay times are used is because it is a necessary condition for mixing two or more types of delay time differences.

Figure 10:
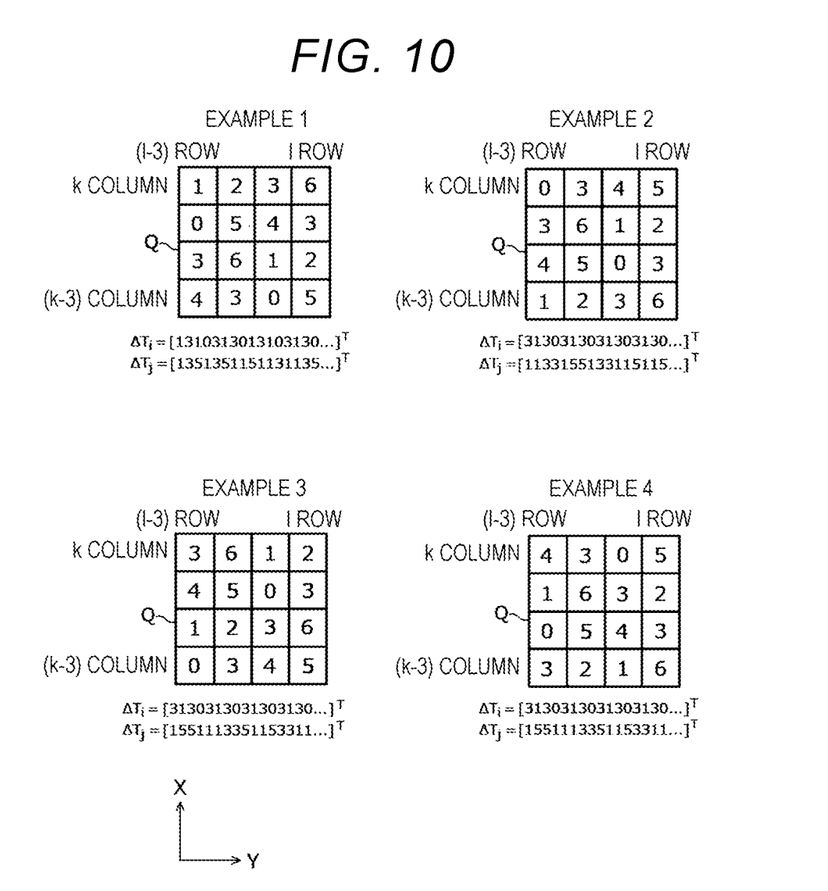
FIG. 10 is a matrix of 4 columns×4 rows of Examples 1 to 4 to which delay times are assigned.

FIG. 10 illustrates the matrices Q of Examples 1 to 4 satisfying the above conditions. In these matrices Q, the delay time assigned to the nozzles 24 in a set of (4 columns×4 rows) is expressed by AL. That is, the delay time of the nozzles 24 is expressed as a multiple of AL (unit: AL). The nozzles 24 having the same numerical value in the frame provide a drive signal to the actuators 3 at the same timing in the same drive cycle.

The matrix Q of Example 1 (4 columns×4 rows) will be described in detail. For example, when the nozzles 24 are disposed in (4 columns×75 rows), the delay time is given to all the nozzles 24 by repeatedly arranging the matrix Q of (4 columns×4 rows) along the Y-axis direction. If the delay time of the i-th nozzle in the X-axis direction and the j-th nozzle 24 in the Y-axis direction is $T_{i,j}$, the distribution of delay times $T_{i,j}$, $T_{i+1,j}$, $T_{i,j+1}$ is as follows:

$$T_{i,j} = \begin{bmatrix} 4 & 3 & 0 & 5 & \ldots & 0 \\ 3 & 6 & 1 & 2 & \ldots & 1 \\ 0 & 5 & 4 & 3 & \ldots & 4 \\ 1 & 2 & 3 & 6 & \ldots & 3 \end{bmatrix};$$

$$T_{i+1,j} = \begin{bmatrix} 3 & 6 & 1 & 2 & \ldots & 1 \\ 0 & 5 & 4 & 3 & \ldots & 4 \\ 1 & 2 & 3 & 6 & \ldots & 3 \\ 4 & 3 & 0 & 5 & \ldots & 0 \end{bmatrix};$$

$$T_{i,j+1} = \begin{bmatrix} 3 & 0 & 5 & 4 & \ldots & 5 \\ 6 & 1 & 2 & 3 & \ldots & 2 \\ 5 & 4 & 3 & 0 & \ldots & 3 \\ 2 & 3 & 6 & 1 & \ldots & 6 \end{bmatrix}$$

However, since the nozzle 24 located at the end of the array of 4 columns×75 rows is excluded by 1 column or 1 row, the delay time of $T_{4,j}$ between columns and $T_{i,75}$ between rows is set to zero (Null).

Therefore, a delay time difference $\Delta T_i$ between columns and a delay time difference $\Delta T_j$ between rows are as follows:

$$\Delta T_i = |T_{i+1,j} - T_{i,j}| = \begin{bmatrix} |3-4| & |6-3| & |1-0| & |2-5| & \ldots & |1-0| \\ |0-3| & |5-6| & |4-1| & |3-2| & \ldots & |4-1| \\ |1-0| & |2-5| & |3-4| & |6-3| & \ldots & |3-4| \\ 0 & 0 & 0 & 0 & \ldots & 0 \end{bmatrix} =$$

$$\begin{bmatrix} 1 & 3 & 1 & 3 & \ldots & 1 \\ 3 & 1 & 3 & 1 & \ldots & 3 \\ 1 & 3 & 1 & 3 & \ldots & 1 \\ 0 & 0 & 0 & 0 & \ldots & 0 \end{bmatrix}$$

$$\Delta T_j = |T_{i+1,j} - T_{i,j}| = \begin{bmatrix} |3-4| & |0-3| & |5-0| & |4-5| & \ldots & 0 \\ |6-3| & |1-6| & |2-1| & |3-2| & \ldots & 0 \\ |5-0| & |4-5| & |3-4| & |0-3| & \ldots & 0 \\ |2-1| & |3-2| & |6-3| & |1-6| & \ldots & 0 \end{bmatrix} =$$

$$\begin{bmatrix} 1 & 3 & 5 & 1 & \ldots & 0 \\ 3 & 5 & 1 & 1 & \ldots & 0 \\ 5 & 1 & 1 & 3 & \ldots & 0 \\ 1 & 1 & 3 & 5 & \ldots & 0 \end{bmatrix}$$

The delay time difference ($\Delta T_i$, $\Delta T_j$) corresponding to the print position is as follows as a vec operator:

$$\text{vec}(\Delta T_i) = [1 3 1 0 3 1 3 0 1 3 1 0 3 1 3 0 \ldots]^T$$

$$\text{vec}(\Delta T_j) = [1 3 5 1 3 5 1 1 5 1 1 3 1 1 3 5 \ldots]^T$$

Here, it can be seen that the maximum width for which the values of the same delay time difference are continuously arranged is in units of 2 distances (Y1 distance×2) in the Y-axis direction. When the resolution is 300 DPI, the maximum width of the print block of Example 1 is 169 μm (=84.5 μm×2).

A print block is a set of blocks that are printed with the same delay time difference. In the case of Example 1, the maximum width of a print block is where two consecutive differences "1" in row-to-row delay time are arranged. That is, the column-to-column and row-to-row delay times $\Delta T_i$ and $\Delta T_j$ are arranged by a vec operator, and the value obtained by multiplying the distance unit (here, in units of 2 distances) in which the same delay time differences are continuously arranged by the resolving power (84.5 μm for 300 DPI) of the resolution of the nozzle 24 in the Y-axis direction is 169 μm.

As illustrated in FIG. 10, in the case of Examples 2 to 4, the maximum width in which the values of the same delay time differences are continuously arranged is in units of 2 to 3 distances in the Y-axis direction (Y1 distance×2 to 3). Therefore, when the resolution is 300 DPI, the maximum width of the print block of Examples 2 to 4 is in the range of 169 μm to 253.5 μm (=84.5 μm×2 to 3).

Figure 11:
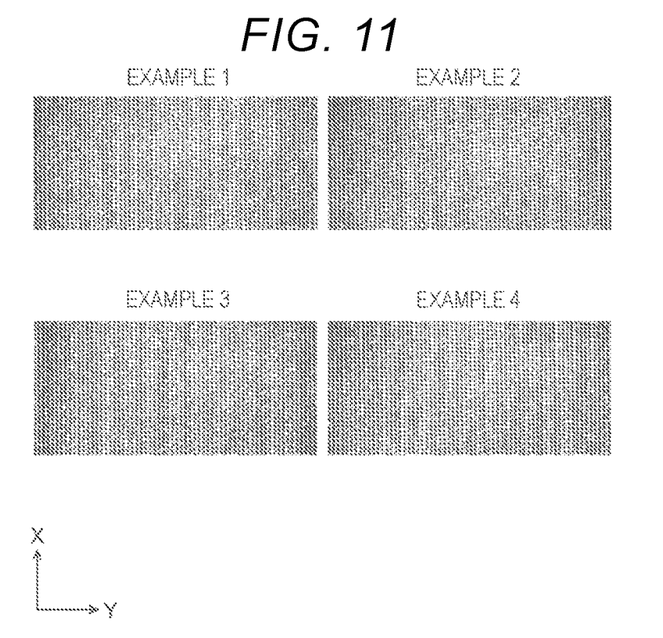
FIG. 11 is a print result of Examples 1 to 4.

FIG. 11 illustrates the results when the delay time is set in the matrices Q of Examples 1 to 4 and the printing is actually performed. The resolving power of an unaided human eye is about 100 μm. In the matrices Q of Examples 1 to 4, the width of the print block is smaller than 3 times (=300 μm) the resolving power of the unaided human eye. Here, as can be seen from the results of FIG. 11, printing unevenness is not noticeable, and printing quality can be improved.

Figure 12:
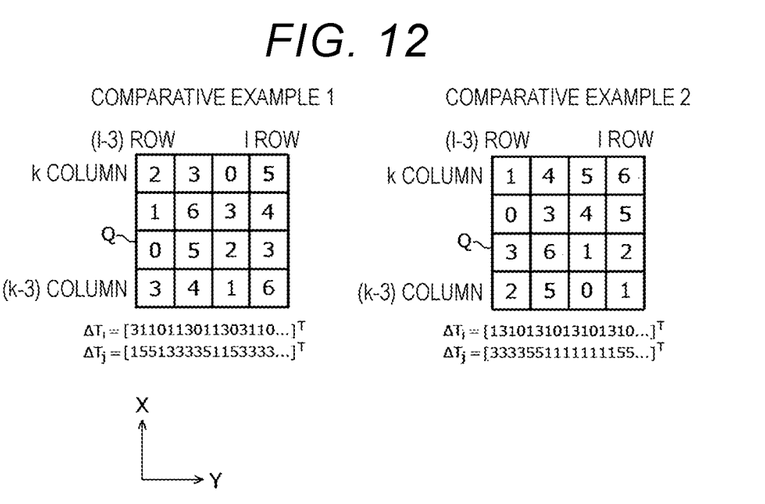
FIG. 12 is a matrix of 4 columns×4 rows of Comparative Examples 1 and 2 to which delay times are assigned.

As a comparative example, an example in which the width of the print block is larger than three times the resolving power of the unaided human eye will be described. FIG. 12 illustrates the matrix Q of Comparative Examples 1 and 2 (4 columns×4 rows), respectively.

In Comparative Example 1, the maximum width in which the values of the same delay time differences are continuously arranged is in units of 4 distances in the Y-axis direction (Y1 distance×4). When the resolution is 300 DPI, the maximum width of the print block of Comparative Example 1 is 338 μm (=84.5 μm×4).

In Comparative Example 2, the maximum width in the Y-axis direction in which the values of the same delay time differences are continuously arranged is in units of 8 distances (Y1 distance×4). When the resolution is 300 DPI, the maximum width of the print block of Comparative Example 2 is 676 μm (=84.5 μm×8). Since the nozzle 24 has 4 columns, the print block is substantially in units of 4 distances (=338 μm=Y1 distance×4) at the column end of the nozzle 24 of 4 columns×75 rows regardless of the difference in the column-to-column and row-to-row delay time.

Figure 13:
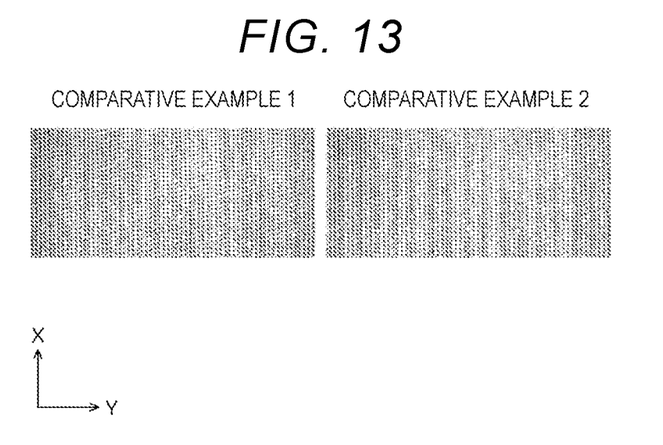
FIG. 13 is a print result of Comparative Examples 1 and 2.

FIG. 13 illustrates the results when the delay time is set in the matrices of Comparative Examples 1 and 2 and the printing is actually performed. As can be seen from the results of FIG. 13, when the width of the print block is larger than three times the resolving power of the unaided human eye, periodic printing unevenness occurs. Therefore, as described above, the width of the print block in the column direction and the row direction is preferably 300 μm or less.

Figure 14:
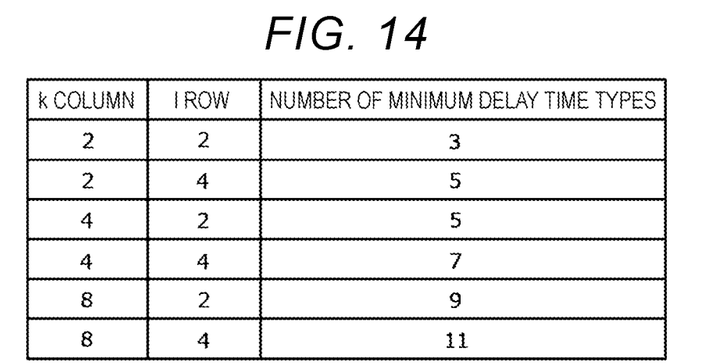
FIG. 14 is a table illustrating the number of minimum delay time types assigned in a matrix (column k×rows l).
Figure 15:
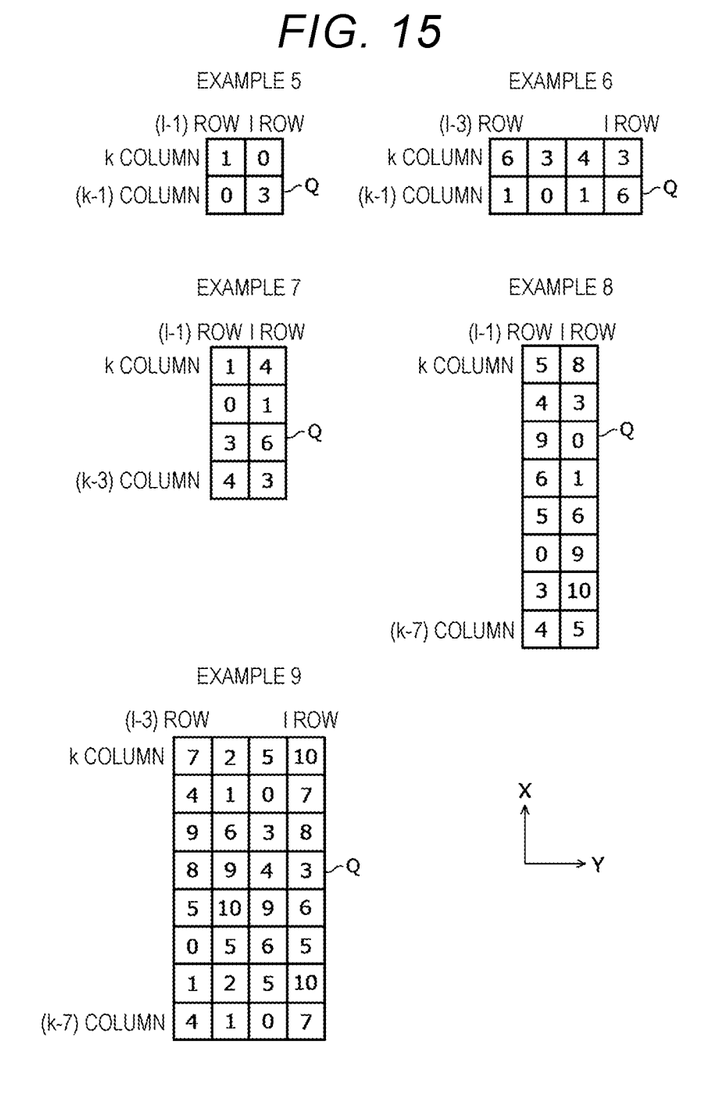
FIG. 15 is a matrix of Examples 5 to 9 (k columns×1 rows) to which delay times are assigned.

FIGS. 14 and 15 illustrate other examples of the matrix Q (k columns×1 rows). FIG. 14 illustrates the minimum number of types of delay times assigned in the matrix Q (k columns×1 rows). That is, at least (k+l−1) types of delay times are assigned in the matrix Q of (k columns×1 rows). FIG. 15 illustrates an example of the delay time of the matrix Q in which the number of columns and the number of rows are changed as Examples 5 to 9.

In Examples 1 to 9, the delay time is set for the nozzle 24 having a recording density of 300 DPI, but the recording density is not limited to 300 DPI and may be 600 DPI or 1200 DPI. When the resolution is 600 DPI, the resolving power to be multiplied by the distance unit of the print block is 42 μm, and when the resolution is 1200 DPI, the resolving power to be multiplied by the distance unit of the print block is 21 μm. The same applies to other resolutions.

In the inkjet heads 100 to 103, the actuators 3 and the nozzles 24 do not have to be disposed on the surface of the nozzle plate 2. Inkjet heads may be provided with an actuator of any type, such as a drop-on-demand piezo system, a shared wall type, or a shear mode type actuator.

In the above-described embodiments, the inkjet head 100 of the inkjet printer 10 is described as an example of the liquid ejection device, but the liquid ejection device may be a modeling material ejection head of a 3D printer or a sample ejection head of a dispensing device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection device, comprising:
   a nozzle plate in which an array of nozzles through which liquid is ejected, is arranged in a matrix configuration, such that the nozzles are arranged in both a longitudinal direction of the nozzle plate and a lateral direction of the nozzle plate;
   a plurality of actuators each connected to a corresponding one of the nozzles; and
   a liquid supply unit providing the liquid to be ejected through the nozzles; and
   an actuator drive circuit configured to output drive signals to the actuators according to delay times in a delay time matrix corresponding to the matrix configuration of the array, wherein
   a total number of the nozzles that are aligned along one line extending in the lateral direction is identical to a total number of columns of the delay time matrix,
   the delay times include at least (k+l−1) different delay times where the delay time matrix has k columns and l rows, and
   in the delay time matrix:
      a difference between two delay times that are adjacent in a column or row directions is an odd multiple of a half cycle of a natural vibration period of the liquid in the nozzles, and
      between two adjacent columns and rows, two or more different delay time differences exist between each pair of corresponding delay times of the adjacent columns and rows, respectively.

2. The liquid ejection device according to claim 1, wherein the delay time matrix is applied to the nozzles so as to be consecutively arranged along the column direction.

3. The liquid ejection device according to claim 1, wherein a width of a print block with the same delay time difference is 300 μm or less.

4. The liquid ejection device according to claim 1, wherein each of k and l is an even number.

5. The liquid ejection device according to claim 4, wherein k and l are the same number.

6. The liquid ejection device according to claim 1, wherein the actuator drive circuit is configured to apply, to each actuator, a first voltage, a second voltage lower than the first voltage according to the corresponding delay time, and a third voltage between the first and second voltages in this order.

7. The liquid ejection device according to claim 1, wherein the nozzle plate includes:
   a common electrode extending along both the longitudinal and lateral directions and connected to the nozzles, and
   a plurality of individual electrodes each extending along the lateral direction and connected to the corresponding nozzle.

8. The liquid ejection device according to claim 7, wherein the nozzle plate includes a diaphragm, the actuators, and a protective layer that are stacked in this order in a direction toward which the liquid is ejected.

9. A liquid ejection device, comprising:
   a liquid supply unit from which liquid is supplied;
   a nozzle plate in which an array of nozzles through which liquid is ejected, is arranged in a matrix configuration, such that the nozzles are arranged in both a longitudinal direction of the nozzle plate and a lateral direction of the nozzle plate;
   a plurality of actuators each connected to a corresponding one of the nozzles; and
   an actuator drive circuit configured to output drive signals to the actuators according to predetermined delay times in a delay time matrix corresponding to the matrix configuration of the array, wherein
   a total number of the nozzles that are aligned along one line extending in the lateral direction is identical to a total number of columns of the delay time matrix, and
   the delay times are defined such that a value obtained by multiplying an actual distance, corresponding to two or more consecutive same values in a vec operator of a matrix that defines delay time differences between each pair of corresponding nozzles of two adjacent rows, by a resolving power of a resolution in the longitudinal direction of the nozzles is 300 μm or less.

10. The liquid ejection device according to claim 9, wherein the delay times are defined such that the value obtained by multiplying the actual distance corresponding to two or more consecutive same values in a vec operator of a matrix that defines delay time differences between each pair of corresponding nozzles of two adjacent columns by the resolving power of a resolution in the lateral direction of the nozzles is 300 μm or less.

11. The liquid ejection device according to claim 9, wherein an even number of the nozzles are arranged along each of the longitudinal direction and the lateral direction.

12. The liquid ejection device according to claim 9, wherein a total number of the nozzles arranged along the longitudinal direction is identical with a total number of the nozzles arranged along the lateral direction.

13. The liquid ejection device according to claim 9, wherein the actuator drive circuit is configured to apply, to each of the actuator, a first voltage, a second voltage lower than the first voltage according to the corresponding delay time, and a third voltage between the first and second voltages in this order.

14. The liquid ejection device according to claim 9, wherein the nozzle plate includes
a common electrode extending along both the longitudinal and lateral directions and connected to the nozzles, and
a plurality of individual electrodes each extending along the lateral direction and connected to the corresponding nozzle.

15. The liquid ejection device according to claim 14, wherein the nozzle plate includes a diaphragm, the actuators, and a protective layer that are stacked in this order in a direction toward which the liquid is ejected.

16. An image forming apparatus, comprising:
a print head including:
an ink supply unit from which ink is supplied;
a nozzle plate in which an array of nozzles through which liquid is ejected, is arranged in a matrix configuration, such that the nozzles are arranged in both a longitudinal direction of the nozzle plate and a lateral direction of the nozzle plate;
a plurality of actuators each connected to a corresponding one of the nozzles; and
an actuator drive circuit configured to output drive signals to the actuators according to delay times in a delay time matrix corresponding to the matrix configuration of the array, wherein
a total number of the nozzles that are aligned along one line extending in the lateral direction is identical to a total number of columns of the delay time matrix,
the delay times include at least (k+l−1) different delay times where the delay time matrix has k columns and l rows, and
in the delay time matrix:
a difference between two delay times that are adjacent in column or row directions is an odd multiple of a half cycle of a natural vibration period of the ink in the print head, and
between two adjacent columns and rows, two or more different delay time differences exist between each pair of corresponding delay times of the adjacent columns and rows, respectively; and
a controller configured to control the print head to print an image on a sheet.

17. The image forming apparatus according to claim 16, wherein the delay time matrix is applied to the matrix of the array so as to be consecutively arranged along the column direction.

* * * * *